(12) United States Patent
Riley et al.

(10) Patent No.: US 11,754,661 B2
(45) Date of Patent: Sep. 12, 2023

(54) LOCATION SERVICES USING A LIGHT FIXTURE

(71) Applicant: SIGNIFY HOLDING B.V., Eindhoven (NL)

(72) Inventors: Peyton Riley, Suwanee, GA (US); Russell Scott Trask, Sharpsburg, GA (US); Babu Papanna, Atlanta, GA (US)

(73) Assignee: SIGNIFY HOLDING B.V., Eindhoven (NL)

( * ) Notice: Subject to any disclaimer, the term of this patent is extended or adjusted under 35 U.S.C. 154(b) by 1216 days.

(21) Appl. No.: 16/283,444

(22) Filed: Feb. 22, 2019

(65) Prior Publication Data

US 2019/0257934 A1 Aug. 22, 2019

Related U.S. Application Data

(60) Provisional application No. 62/633,974, filed on Feb. 22, 2018.

(51) Int. Cl.
*G01S 5/02* (2010.01)
*H04W 4/80* (2018.01)
*G01S 13/08* (2006.01)
*G06V 20/64* (2022.01)
*G01S 5/06* (2006.01)

(52) U.S. Cl.
CPC .................... *G01S 5/02* (2013.01); *G01S 5/06* (2013.01); *G01S 13/08* (2013.01); *G06V 20/64* (2022.01); *H04W 4/80* (2018.02)

(58) Field of Classification Search
None
See application file for complete search history.

(56) References Cited

U.S. PATENT DOCUMENTS

| 6,528,954 B1 * | 3/2003 | Lys ..................... H05B 45/22 315/158 |
| 7,026,989 B1 | 4/2006 | Minkoff et al. |
| 2002/0105463 A1 | 8/2002 | Vail |
| 2006/0092072 A1 | 5/2006 | Steiner |
| 2014/0327579 A1 * | 11/2014 | Hart ....................... G01S 3/48 342/442 |

(Continued)

FOREIGN PATENT DOCUMENTS

WO WO 2017/213808 A1 * 5/2017 ............. H05B 37/02

OTHER PUBLICATIONS

A Survey on Multiple Access Visible Light Positioning, DeLausnay et al., 2016 IEEE International Conference on Emerging Technologies and Innovative Business Practices for the Transformation of Societies (EmergiTech).*

(Continued)

*Primary Examiner* — David J Stoltenberg

(57) ABSTRACT

A system for locating an object in a volume of space can include a first electrical device disposed in the volume of space and having a first antenna and a first controller, where the first controller reduces a first default range of the first antenna to a first effective range. The system can also include an object disposed within the first effective range, where the first controller recognizes a first signal, using the first antenna, that identifies the object in the first effective range.

19 Claims, 10 Drawing Sheets

(56) References Cited

U.S. PATENT DOCUMENTS

| | | | | |
|---|---|---|---|---|
| 2015/0043426 | A1* | 2/2015 | Aggarwal | H04B 10/116 370/328 |
| 2015/0296476 | A1* | 10/2015 | Wilmhoff | G01S 3/14 455/456.1 |
| 2015/0369618 | A1* | 12/2015 | Barnard | H04W 4/70 701/491 |
| 2016/0323717 | A1* | 11/2016 | Friday | H04B 17/373 |
| 2016/0334498 | A1* | 11/2016 | Jamieson | G01S 5/02213 |
| 2017/0108579 | A1 | 4/2017 | Irvine et al. | |
| 2017/0111980 | A1* | 4/2017 | Bátai | H04W 64/00 |
| 2017/0288774 | A1* | 10/2017 | Ryan | H05B 47/19 |
| 2018/0074188 | A1* | 3/2018 | Polo | G01S 13/42 |
| 2018/0102858 | A1* | 4/2018 | Tiwari | H04L 67/52 |
| 2018/0103347 | A1* | 4/2018 | Mycek | H04W 48/12 |
| 2018/0103351 | A1* | 4/2018 | Emmanuel | H04W 36/0083 |
| 2019/0104384 | A1* | 4/2019 | Abou-Rizk | G01S 5/08 |

OTHER PUBLICATIONS

2016 IEEE International Conference on Emerging Technologies and Innovative Business Practices for the Transformation of Societies (EmergiTech), Sevincer et al., IEEE Communications Surveys & Tutorials, vol. 15, No. 4, Fourth Quarter 2013.*

Implementation and validation of an Angle of Arrival (AOA) determination system; Arenas et al., 978-1-4673-7228-2/15 © 2015 IEEE.*

EnLighting: An Indoor Visible Light Communication System Based on Networked Light Bulbs; Schmid et al., 978-1-5090-1732-4/16/ © 2016 IEEE.*

A Survey of Indoor Localization Systems and Technologies; Zafari et al., arXiv:1709.01015v3 [cs.NI] Jan. 16, 2019.*

International search report for PCT/EP2019/025049, dated May 24, 2019.

* cited by examiner

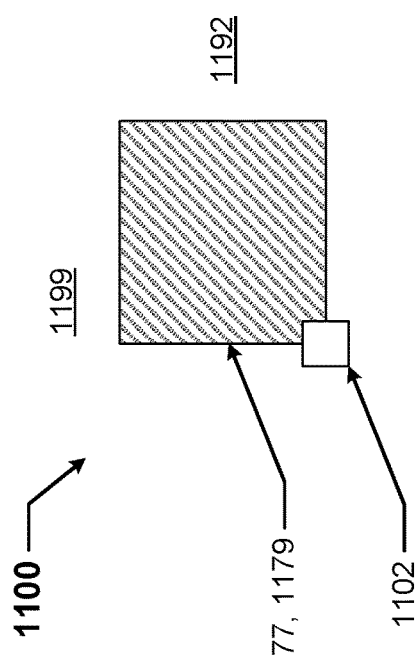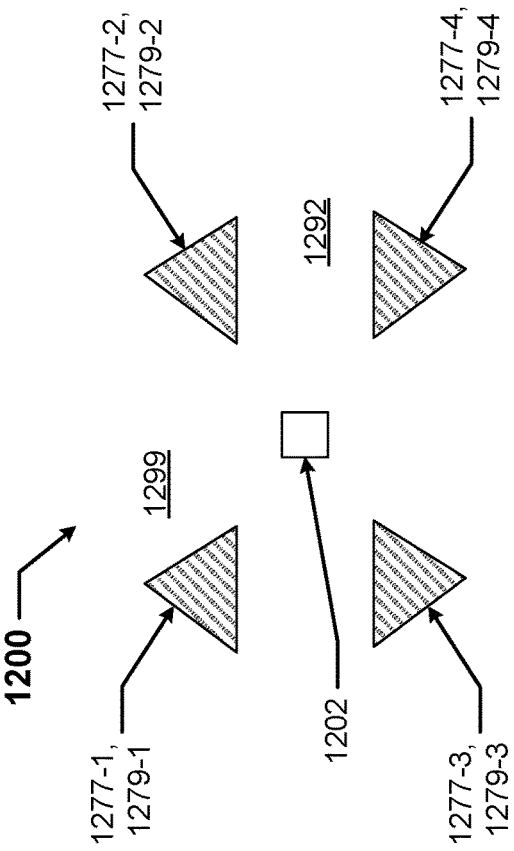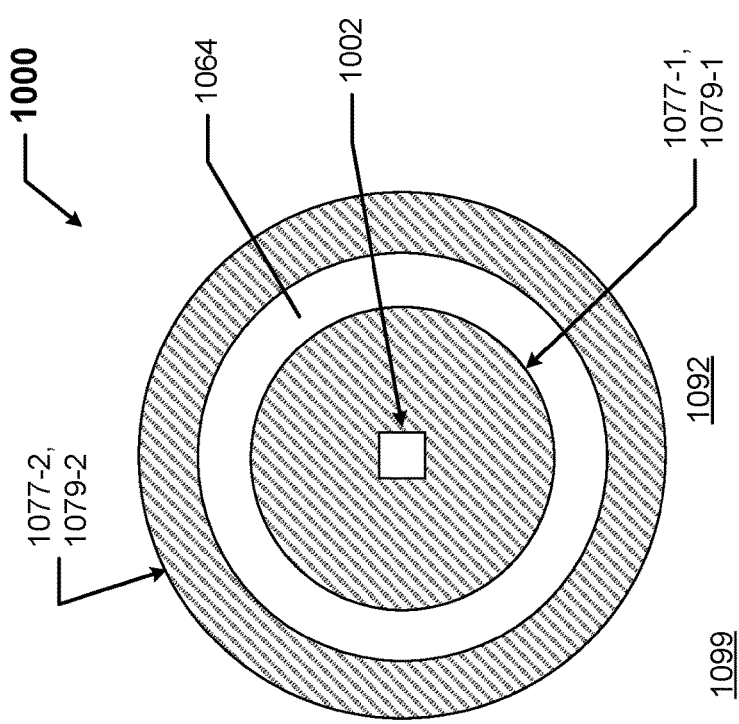
FIG. 10
FIG. 11
FIG. 12

LOCATION SERVICES USING A LIGHT FIXTURE

CROSS-REFERENCE TO RELATED APPLICATIONS

This application claims priority under 35 U.S.C. § 119 to United States Provisional Patent Application Ser. No. 62/633,974, titled "Location Services Using a Light Fixture" and filed on Feb. 22, 2018, the entire contents of which are hereby incorporated herein by reference.

TECHNICAL FIELD

Embodiments described herein relate generally to locating objects in a space, and more particularly to systems, methods, and devices for locating objects in a space using a light fixture or other electrical device.

BACKGROUND

Different methods are used to locate an object within a volume of space. For example, when signals are involved, the angle of arrival (AoA) and/or the Angle of Departure (AoD) of each signal can be measured to help determine the location of an object within a volume of space. Currently, a considerable amount of processing effort is put into using readings of multiple (often three or more) measurement points to determine the precise location of an object.

SUMMARY

In general, in one aspect, the disclosure relates to a system for locating an object in a volume of space. The system can include a first electrical device disposed in the volume of space and having a first antenna and a first controller, where the first controller reduces a first default range of the first antenna to a first effective range. The system can also include an object disposed within the first effective range, where the first controller recognizes a first signal, using the first antenna, that identifies the object in the first effective range.

In another aspect, the disclosure can generally relate to an electrical device used to locate an object in a volume of space. The electrical device can include a first antenna having a first default range. The electrical device can also include a controller coupled to the first antenna, where the controller reduces the first default range to a first effective range. The controller can ignore a first RF signal associated with the object that is received from within the first default range but outside the first effective range. The controller recognizes a second RF signal associated with the object that is received from within the first effective range.

These and other aspects, objects, features, and embodiments will be apparent from the following description and the appended claims.

BRIEF DESCRIPTION OF THE DRAWINGS

The drawings illustrate only example embodiments of location services using a light fixture and are therefore not to be considered limiting of its scope, as location services using a light fixture may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 10-12 shows various configurations of an effective range in accordance with certain example embodiments.

DETAILED DESCRIPTION OF EXAMPLE EMBODIMENTS

Figure 1:
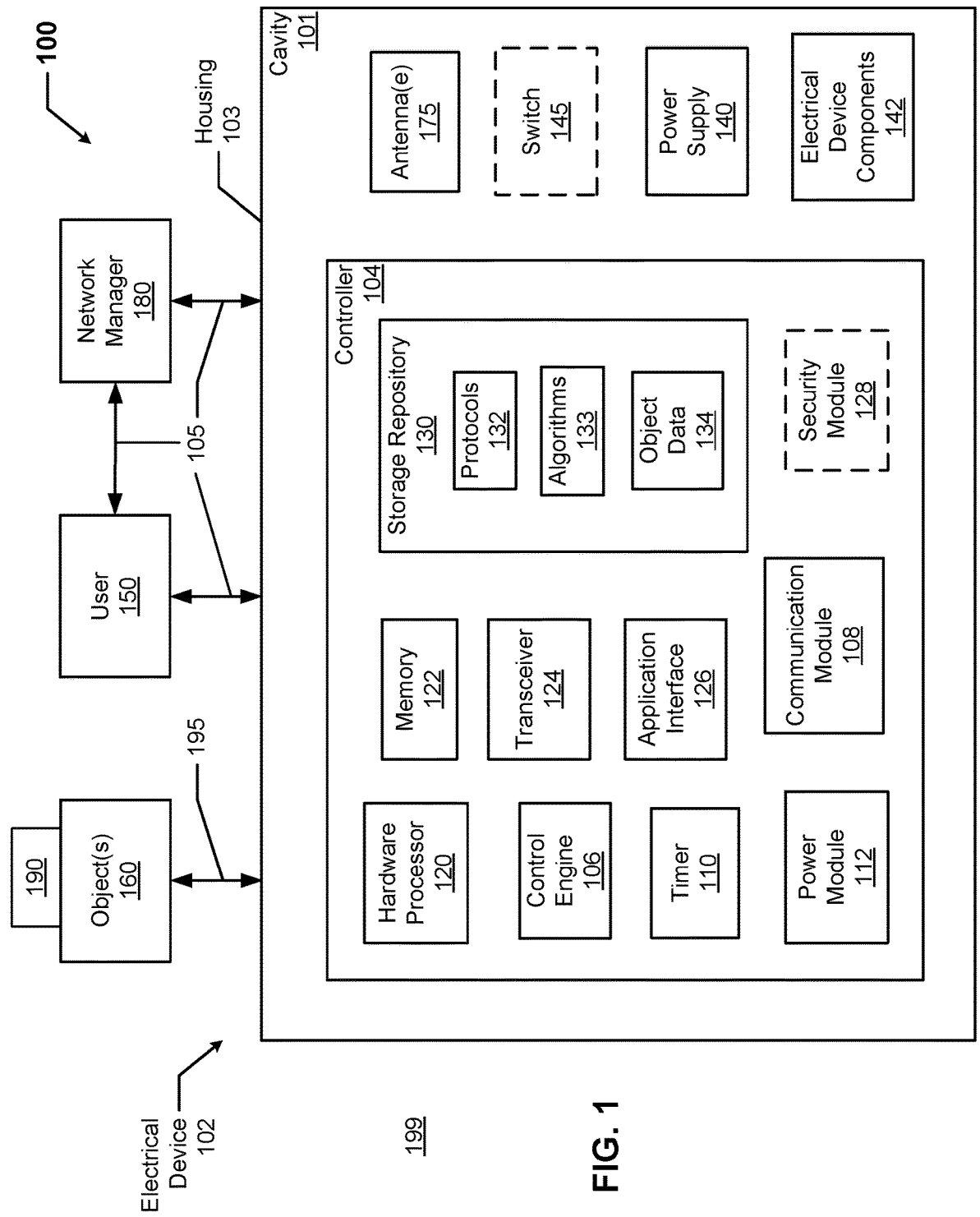
FIG. 1 shows a diagram of a system that includes an electrical device in accordance with certain example embodiments.

The example embodiments discussed herein are directed to systems, methods, and devices for location services using a light fixture. While example embodiments are described herein as using a light fixture (or components thereof) to locate an object in a volume of space, example embodiments can use one or more of a number of other electrical devices in addition to, or as an alternative to, light fixtures. Such other electrical devices can include, but are not limited to, a light switch, a control panel, a wall outlet, a smoke detector, a $CO_2$ monitor, a motion detector, a broken glass sensor, and a camera.

Example embodiments can be used for a volume of space having any size and/or located in any environment (e.g., indoor, outdoor, hazardous, non-hazardous, high humidity, low temperature, corrosive, sterile, high vibration). Further, while signals described herein are radio frequency (RF) signals using Bluetooth Low Energy (BLE), example embodiments can be used with any of a number of other types of signals, including but not limited to WiFi, Bluetooth, RFID, ultraviolet waves, microwaves, and infrared signals. Example embodiments can be used to locate an object in a volume of space in real time.

Example embodiments of light fixtures described herein can use one or more of a number of different types of light sources, including but not limited to light-emitting diode (LED) light sources, fluorescent light sources, organic LED light sources, incandescent light sources, and halogen light sources. Therefore, light fixtures described herein, even in hazardous locations, should not be considered limited to a particular type of light source.

A user may be any person that interacts with a light fixture and/or object in a volume of space. Specifically, a user may program, operate, and/or interface with one or more components (e.g., a controller, a network manager) associated with a system using example embodiments. Examples of a user may include, but are not limited to, an engineer, an electrician, an instrumentation and controls technician, a mechanic, an operator, a consultant, a contractor, an asset, a network manager, and a manufacturer's representative.

As defined herein, an object can be any unit or group of units. An object can move on its own, is capable of being moved, or is stationary. Examples of an object can include, but are not limited to, a person (e.g., a user, a visitor, an employee), a part (e.g., a motor stator, a cover), a piece of equipment (e.g., a fan, a container, a table, a chair, a computer, a printer), or a group of parts of equipment (e.g., a pallet stacked with inventory).

In certain example embodiments, light fixtures having one or more antennae used for location of an object are subject to meeting certain standards and/or requirements. For example, the National Electric Code (NEC), the National Electrical Manufacturers Association (NEMA), the International Electrotechnical Commission (IEC), Underwriters Laboratories (UL), the Federal Communication Commission (FCC), the Bluetooth Special Interest Group, and the Institute of Electrical and Electronics Engineers (IEEE) set standards that can be applied to electrical enclosures (e.g., light fixtures), wiring, location services, and electrical connections. Use of example embodiments described herein meet (and/or allow a corresponding device to meet) such standards when required. In some (e.g., PV solar) applications, additional standards particular to that application may be met by the electrical enclosures described herein.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three-digit or a four-digit number and corresponding components in other figures have the identical last two digits. For any figure shown and described herein, one or more of the components may be omitted, added, repeated, and/or substituted. Accordingly, embodiments shown in a particular figure should not be considered limited to the specific arrangements of components shown in such figure.

Further, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of location services using a light fixture will be described more fully hereinafter with reference to the accompanying drawings, in which example embodiments of location services using a light fixture are shown. Location services using a light fixture may, however, be embodied in many different forms and should not be construed as limited to the example embodiments set forth herein. Rather, these example embodiments are provided so that this disclosure will be thorough and complete, and will fully convey the scope of location services using a light fixture to those of ordinary skill in the art. Like, but not necessarily the same, elements (also sometimes called components) in the various figures are denoted by like reference numerals for consistency.

Terms such as "first", "second", "outer", "inner", "top", "bottom", "on", and "within" are used merely to distinguish one component (or part of a component or state of a component) from another. Such terms are not meant to denote a preference or a particular orientation, and are not meant to limit embodiments of location services using a light fixture. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a diagram of a system 100 that includes multiple electrical devices 102 (although only one is shown) in accordance with certain example embodiments. The system 100 can include one or more objects 160, a user 150, and a network manager 180. The electrical device 102 can include a controller 104, one or more antenna 175, an optional switch 145, a power supply 140, and a number of electrical device components 142. The controller 104 can include one or more of a number of components. Such components, can include, but are not limited to, a control engine 106, a communication module 108, a timer 110, a power module 112, a storage repository 130, a hardware processor 120, a memory 122, a transceiver 124, an application interface 126, and, optionally, a security module 128.

The components shown in FIG. 1 are not exhaustive, and in some embodiments, one or more of the components shown in FIG. 1 may not be included in the example system 100. For instance, any component of the example electrical device 102 can be discrete or combined with one or more other components of the electrical device 102. For example, rather than one optional switch 145, there can be multiple optional switches 145. As another example, instead of a single electrical device 102 with multiple antennae 175, the system 100 can have multiple electrical devices 102, each with one or more antennae 175, that are communicably coupled to each other. As yet another example, the optional switch 145 can be part of the controller 104.

The user 150 is the same as a user defined above. The user 150 can use a user system (not shown), which may include a display (e.g., a GUI). The user 150 interacts with (e.g., sends data to, receives data from) the controller 104 of an electrical device 102 via the application interface 126 (described below). The user 150 can also interact with a network manager 180 and/or one or more of the objects 160. Interaction between the user 150, the electrical device 102, and the network manager 180 is conducted using communication links 105. In some cases, the user 150, the electrical device 102, and/or the network manager 180 can also interact with the object 160 using communication links 105.

Each communication link 105 can include wired (e.g., Class 1 electrical cables, Class 2 electrical cables, electrical connectors) and/or wireless (e.g., Wi-Fi, visible light communication, cellular networking, Bluetooth, WirelessHART, ISA100, Power Line Carrier, RS485, DALI) technology. For example, a communication link 105 can be (or include) one or more electrical conductors that are coupled to the housing 103 of an electrical device 102 and to the network manager 180. The communication link 105 can transmit signals (e.g., power signals, communication signals, control signals, data) between the electrical device 102, the user 150, and the network manager 180. By contrast, the electrical device 102 of the system 100 can interact with the one or more objects 160 using location signals 195, as discussed below. The one or more objects 160 can communicate with the user 150 and/or the network manager 180 using the communication links 105.

The network manager 180 is a device or component that controls all or a portion of the system 100 that includes the controller 104 of the electrical device 102. The network manager 180 can be substantially similar to the controller 104. Alternatively, the network manager 180 can include one or more of a number of features in addition to, or altered from, the features of the controller 104 described below.

The one or more objects 160 can be any of a number of people and/or devices, as described above. Each object 160 can include a communication device 190, which can send RF signals 195 to and/or receive RF signals 195 from the electrical device 102. The communication device 190 can include one or more components (e.g., switch, antenna, transceiver) of an electrical device 102 and/or functionality described below with respect to a controller 104 of an electrical device 102. The RF signals 195 described herein can be transmitted in any of a number of ways, including BLE.

Using example embodiments, the communication device 190 (also sometimes called a beacon) of the object 160 can be in sleep mode until the communication device 190 receives a RF signal 195 broadcast by one or more antennae 175 of the electrical device 102. When this occurs, the communication device 190 can turn on long enough to interpret the initial RF signal 195, and then generate and send its own RF signal 195 to the electrical device 102 in response to the initial RF signal 195.

Alternatively, the communication device 190 of the object 160 can be in sleep mode until some pre-determined point in time (e.g., every hour, every 24 hours) that is independent of the antennae 175 of the electrical device 102 or RF signals 195 sent by the electrical device 102. When this occurs, the communication device 190 can turn on long enough to send a RF signal 195 to the electrical device 102 so that one or more of the antennae 175 of the electrical device 102 receive the RF signal 195. This latter embodiment can be used with AoA methods of locating the object 160. In any case, the RF signal 195 can include a UUID (or some other form of identification) associated with the object 160. Once the RF signal 195 is sent by the communication device 190 of the object 160, the communication device 190 can go back into sleep mode, thereby reserving a considerable amount of power.

The communication device 190 of the object 160 can use one or more of a number of communication protocols in transceiving (sending and/or receiving) RF signals 195 with the antennae 175 of the electrical device 102. In certain example embodiments, an object 160 can include a battery (a form of power supply or power module) that is used to provide power, at least in part, to some or all of the rest of the object 160, including the communication device 190.

In certain example embodiments, when an object 160 is located using AoD methods, the communication device 190 can include multiple antennae and a corresponding switch, where an antenna is substantially the same as an antenna 175 described above, and the optional switch is substantially the same as the optional switch 145 described above. In such a case, the electrical device 102 can have one antenna 175 with no switch 145 or multiple antennae 175 with a corresponding switch 145. Alternatively, the communication device 190 of the object 160 can include a single antenna.

The user 150, the network manager 180, and/or any other applicable electrical devices 102 can interact with the controller 104 of the electrical device 102 using the application interface 126 in accordance with one or more example embodiments. Specifically, the application interface 126 of the controller 104 receives data (e.g., information, communications, instructions) from and sends data (e.g., information, communications, instructions) to the user 150, the controller 104 of another electrical device 102, and the network manager 180. The user 150 and the network manager 180 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, and the network manager 180 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with Local Area Network (LAN), Wide Area Network (WAN), Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, LAN, WAN, or other network communication methods) and/or communication channels, with wire and/or wireless segments according to some example embodiments. The software of one system can be a part of, or operate separately but in conjunction with, the software of another system within the system 100.

The electrical device 102 can include a housing 103. The housing 103 can include at least one wall that forms a cavity 101. In some cases, the housing 103 can be designed to comply with any applicable standards so that the electrical device 102 can be located in a particular environment (e.g., a hazardous environment). For example, if the electrical device 102 is located in an explosive environment, the housing 103 can be explosion-proof. According to applicable industry standards, an explosion-proof enclosure is an enclosure that is configured to contain an explosion that originates inside, or can propagate through, the enclosure.

The housing 103 of the electrical device 102 can be used to house one or more components of the electrical device 102, including one or more components of the controller 104. For example, as shown in FIG. 1, the controller 104 (which in this case includes the control engine 106, the communication module 108, the timer 110, the power module 112, the storage repository 130, the hardware processor 120, the memory 122, the transceiver 124, the application interface 126, and the optional security module 128), the power supply 140, the one or more antenna 175, the optional switch 145, and the electrical device components 142 are disposed in the cavity 101 formed by the housing 103. In alternative embodiments, any one or more of these or other components of the electrical device 102 can be disposed on the housing 103 and/or remotely from the housing 103.

The storage repository 130 can be a persistent storage device (or set of devices) that stores software and data used to assist the controller 104 in communicating with the user 150, the network manager 180, and one or more of the objects 160, and any other applicable electrical devices 102 within the system 100. In one or more example embodiments, the storage repository 130 stores one or more protocols 132, algorithms 133, and object data 134. The protocols 132 can be any procedures (e.g., a series of method steps) and/or other similar operational procedures that the control engine 106 of the controller 104 follows based on certain conditions at a point in time.

The protocols 132 can also include any of a number of communication protocols that are used to send and/or receive data between the controller 104 and the user 150, the network manager 180, any other applicable electrical devices 102, and one or more of the objects 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of one or more algorithms 133 is calculating, using signal strengths, the distance of one or more objects 160 to the electrical device 102 and using these calculations to determine the location of the object 160 in a volume of space 199. Another example of one or more algorithms 133 is to track movement of one or more objects 160 in the volume of space 199.

Object data 134 can be any data associated with each object 160 that is communicably coupled to the controller 104. Such data can include, but is not limited to, a manufacturer of the object 160, a model number of the object 160, communication capability of an object 160, last known location of the object 160, and age of the object 160. The storage repository 130 can also include other types of data, including but not limited to user preferences, threshold values, and three-dimensional locations of the electrical devices 102 in the volume of space 199.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the protocols 132, algorithms 133, and/or the object data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, any other applicable electrical devices 102, and the objects 160 in the system 100. More specifically, the control engine 106 sends information to and/or receives information from the storage repository 130 in order to communicate with the user 150, the network manager 180, any other applicable electrical devices 102, and the objects 160. As discussed below, the storage repository 130 can also be operatively connected to the communication module 108 in certain example embodiments.

In certain example embodiments, the control engine 106 of the controller 104 controls the operation of one or more other components (e.g., the communication module 108, the timer 110, the transceiver 124) of the controller 104. For example, the control engine 106 can put the communication module 108 in "sleep" mode when there are no communications between the controller 104 and another component (e.g., an object 160, the user 150) in the system 100 or when communications between the controller 104 and another component in the system 100 follow a regular pattern. In such a case, power consumed by the controller 104 is conserved by only enabling the communication module 108 when the communication module 108 is needed.

As another example, the control engine 106 can direct the timer 110 when to provide a current time, to begin tracking a time period, and/or perform another function within the capability of the timer 110. As yet another example, the control engine 106 can direct the transceiver 124 to receive, using one or more of the antennae 175, RF signals 195 from one or more objects 160 in the system 100. This example provides another instance where the control engine 106 can conserve power used by the controller 104 and other components (e.g., the objects 160) of the system 100.

The control engine 106 can determine when to receive one or more RF signals 195 in an attempt to locate an object 160. To conserve energy, the control engine 106 does not constantly receive RF signals 195, but rather only does so at discrete times. The control engine 106 can be active to receive a RF signal 195 based on one or more of a number of factors, including but not limited to passage of time, the occurrence of an event, instructions from a user 150, and a command received from the network manager 180.

The control engine 106 of the controller 104 can also determine when a RF signal 195 that is received should be ignored. For example, as described below, if a RF signal 195 is received from an object 160 at an angle that exceeds (or in some cases falls below) a threshold value or range of values, then the control engine 106 can determine that the RF signal 195 should be ignored. In some cases, when the system 100 includes multiple electrical devices 102, each electrical device 102 can have some form of a controller 104. The control engine 106 of one controller 104 can coordinate with the controllers 104 of one or more of the other electrical devices 102. The control engine 106 can operate one or more optional switches 145 to accomplish its function.

In some cases, the control engine 106 of the electrical device 102 can locate the object 160 based on one or more RF signals 195 sent by (e.g., originated from, reflected off of) the object 160 in response to one or more RF signals 195 broadcast by one or more electrical devices 102. To accomplish this, the control engine 106 obtains an RF signal 195 (e.g., directly from the antennae 175) broadcast by the object 160 and/or reflected from the object 160. The control engine 106 can also uses one or more protocols 132 and/or algorithms 133 to determine the multi-dimensional location of the object 160 based on the RF signals 195.

As discussed below, each antenna 175 has a range of angles at which signals can be received or sent. A default range of angles (also more simply called a default range) includes all of the angles that an antenna 175 can send and/or receive signals based on factors that include, but are not limited to, the shape and size of the antenna 175, the position of the antenna 175 relative to the housing 103 of the electrical device 102, and the location of an object 160 relative to the antenna 175.

In certain example embodiments, the range of angles at which a signal from an object 160 or other component of the system 100 is received by and/or sent from one or more of the antennae 175 is reduced from the default range. This reduced range of angles is called an effective range of angles (or more simply an effective range). The effective range can be set manually. For example, a user 150 can manipulate one or more adjustment components (e.g., dials, switches) disposed on the housing 103. As another example, a user 150 using a user system (e.g., an app on a smart phone) can manipulate one or more settings that define the effective range.

In addition, or in the alternative, the effective range can be set automatically. For example, the control engine 106 of the controller 104 can set/adjust the effective range based on the occurrence of a condition (e.g., passage of time, identification of a particular object 160), based on receipt of an instruction from the network manager 180, and/or based on some other factor or event. In any case, the control engine 106 sets and/or adjusts the effective range for each antenna 175 of the electrical device 102. As discussed below, such as in FIGS. 10-12, the effective range for an antenna 175 can have any of a number of shapes and/or sizes. An effective range can be continuous and/or discrete. An effective range can be centered with respect to a central axis of the antenna 175 or offset from such central axis of the antenna.

For example, the protocols 132 and/or algorithms 133 used by the control engine 106 can require the control engine 106 to determine the angle of arrival (AoA) and/or the angle of departure (AoD) of each RF signal 195 received from an object 160. The protocols 132 and/or algorithms 133 used by the control engine 106 to dictate when and how the control engine 106 operates the optional switch 145. The protocols 132 and/or algorithms 133 can also be used by the control engine 106 to determine which RF signals 195 to ignore.

In addition to locating an object 160, the control engine 106 of the controller 104 can track, according to example embodiments, the movement of the object 160 over time in the volume of space 199. In addition, or in the alternative, the control engine 106 of the controller 104 can detect, according to example embodiments, when the object 160 is moving or has moved from a previously-known location in the volume of space 199.

The control engine 106 can provide control, communication, RF signals 195, and/or other signals to the user 150, the network manager 180, and one or more of the objects 160. Similarly, the control engine 106 can receive control, communication, RF signals 195, and/or other signals from the user 150, the network manager 180, and one or more of the objects 160. The control engine 106 can communicate with each object 160 automatically (for example, based on one or more algorithms 133 stored in the storage repository 130) and/or based on control, communication, and/or other similar signals received from another device (e.g., the network manager 180) using the RF signals 195. The control engine 106 may include a printed circuit board, upon which the hardware processor 120 and/or one or more discrete components of the controller 104 are positioned.

In certain example embodiments, the control engine 106 can include an interface that enables the control engine 106 to communicate with one or more components (e.g., power supply 140) of the electrical device 102. For example, if the power supply 140 of the electrical device 102 operates under IEC Standard 62386, then the power supply 140 can include a digital addressable lighting interface (DALI). In such a case, the control engine 106 can also include a DALI to enable communication with the power supply 140 within the electrical device 102. Such an interface can operate in conjunction with, or independently of, the communication protocols 132 used to communicate between the controller 104 and the user 150, the network manager 180, any other applicable electrical devices 102, and the objects 160.

The control engine 106 (or other components of the controller 104) can also include one or more hardware and/or software architecture components to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit ($I^2C$), and a pulse width modulator (PWM).

Using example embodiments, while at least a portion (e.g., the control engine 106, the timer 110) of the controller 104 is always on, the remainder of the controller 104 and the objects 160 can be in sleep mode when they are not being used. In addition, the controller 104 can control certain aspects (e.g., sending RF signals 195 to and/or receiving RF signals 195 from an object 160, operating an optional switch 145) of one or more other applicable electrical devices 102 in the system 100.

The communication network (using the communication links 105) of the system 100 can have any type of network architecture. For example, the communication network of the system 100 can be a mesh network. As another example, the communication network of the system 100 can be a star network. When the controller 104 includes an energy storage device (e.g., a battery as part of the power module 112), even more power can be conserved in the operation of the system 100. In addition, using time-synchronized communication protocols 132, the data transferred between the controller 104 and the user 150, the network manager 180, and any other applicable electrical devices 102 can be secure.

The communication module 108 of the controller 104 determines and implements the communication protocol (e.g., from the protocols 132 of the storage repository 130) that is used when the control engine 106 communicates with (e.g., sends signals to, receives signals from) the user 150, the network manager 180, any other applicable electrical devices 102, and/or one or more of the objects 160. In some cases, the communication module 108 accesses the object data 134 to determine which communication protocol is within the capability of the object 160 for a RF signal 195 sent by the control engine 106. In addition, the communication module 108 can interpret the communication protocol of a communication (e.g., a RF signal 195) received by the controller 104 so that the control engine 106 can interpret the communication.

The communication module 108 can send data (e.g., protocols 132, object data 134) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The timer 110 of the controller 104 can track clock time, intervals of time, an amount of time, and/or any other measure of time. The timer 110 can also count the number of occurrences of an event, whether with or without respect to time. Alternatively, the control engine 106 can perform the counting function. The timer 110 is able to track multiple time measurements concurrently. The timer 110 can measure multiple times simultaneously. The timer 110 can track time periods based on an instruction received from the control engine 106, based on an instruction received from the user 150, based on an instruction programmed in the software for the controller 104, based on some other condition or from some other component, or from any combination thereof.

The power module 112 of the controller 104 provides power to one or more other components (e.g., timer 110, control engine 106) of the controller 104. In addition, in certain example embodiments, the power module 112 can provide power to the power supply 140 of the electrical device 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned.

The power module 112 can include one or more components (e.g., a transformer, a diode bridge, an inverter, a converter) that receives power (for example, through an electrical cable) from a source external to the electrical device 102 and generates power of a type (e.g., alternating current, direct current) and level (e.g., 12V, 24V, 120V) that can be used by the other components of the controller 104 and/or by the power supply 140. In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system.

The hardware processor 120 of the controller 104 executes software in accordance with one or more example embodiments. Specifically, the hardware processor 120 can execute software on the control engine 106 or any other portion of the controller 104, as well as software used by the user 150, and the network manager 180, and/or any other applicable electrical devices 102. The hardware processor 120 can be an integrated circuit, a central processing unit, a multi-core processing chip, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), and/or one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals, including RF signals 195. Specifically, the transceiver 124 can be used to transfer data between the controller 104 and the user 150, the network manager 180, any other applicable electrical devices 102, and/or the objects 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, any other applicable electrical devices 102, and/or the objects 160.

When the transceiver 124 uses wireless technology, any type of wireless technology can be used by the transceiver 124 in sending and/or receiving signals. Such wireless technology can include, but is not limited to, Wi-Fi, visible light communication, cellular networking, and Bluetooth. The transceiver 124 can use one or more of any number of suitable communication protocols (e.g., ISA100, HART) when sending and/or receiving signals, including RF signals 195. Such communication protocols can be stored in the protocols 132 of the storage repository 130. Further, any transceiver information for the user 150, the network manager 180, any other applicable electrical devices 102, and/or the objects 160 can be part of the object data 134 (or similar areas) of the storage repository 130.

Optionally, in one or more example embodiments, the security module 128 secures interactions between the controller 104, the user 150, the network manager 180, any other applicable electrical devices 102, and/or the objects 160. More specifically, the security module 128 authenticates communication from software based on security keys verifying the identity of the source of the communication. For example, user software may be associated with a security key enabling the software of the user 150 to interact with the controller 104 of the electrical device 102. Further, the security module 128 can restrict receipt of information, requests for information, and/or access to information in some example embodiments.

As mentioned above, aside from the controller 104 and its components, the electrical device 102 can include a power supply 140, one or more antennae 175, an optional switch 145, and one or more electrical device components 142. The electrical device components 142 of the electrical device 102 are devices and/or components typically found in an electrical device to allow the electrical device 102 to operate. An electrical device component 142 can be electrical, electronic, mechanical, or any combination thereof. The electrical device 102 can have one or more of any number and/or type of electrical device components 142. If an electrical device 102 is a light fixture, then examples of such electrical device components 142 can include, but are not limited to, a light source, a light engine, a heat sink, an electrical conductor or electrical cable, a terminal block, a lens, a diffuser, a reflector, an air moving device, a baffle, a dimmer, and a circuit board.

The power supply 140 of the electrical device 102 provides power to the controller 104 and/or one or more of the electrical device components 142. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned.

The power supply 140 can include one or more components (e.g., a transformer, a diode bridge, an inverter, a converter) that receives power (for example, through an electrical cable) from or sends power to the power module 112 of the controller 104. The power supply can generate power of a type (e.g., alternating current, direct current) and level (e.g., 12V, 24V, 120V) that can be used by the recipients (e.g., the electrical device components 142, the controller 106) of such power. In addition, or in the alternative, the power supply 140 can receive power from a source external to the electrical device 102-1. In addition, or in the alternative, the power supply 140 can be a source of power in itself. For example, the power supply 140 can be a battery, a localized photovoltaic power system, or some other source of independent power.

As discussed above, the electrical device 102 includes one or more antennae 175. An antenna 175 is an electrical device that converts electrical power to RF signals 195 (for transmitting) and RF signals 195 to electrical power (for receiving). In transmission, a radio transmitter (e.g., transceiver 124) supplies, through the optional switch 145, an electric current oscillating at radio frequency (i.e. a high frequency alternating current (AC)) to the terminals of the antenna 175, and the antenna radiates the energy from the current as RF signals 195. In reception, an antenna 175 intercepts some of the power of RF signals 195 in order to produce a tiny voltage at its terminals, that is applied through the switch 145 to a receiver (e.g., transceiver 124) to be amplified.

An antenna 175 can typically consist of an arrangement of electrical conductors that are electrically connected to each other (often through a transmission line) to create a body of the antenna 175. The body of the antenna 175 is electrically coupled to the transceiver 124. An oscillating current of electrons forced through the body of an antenna 175 by the transceiver 124 will create an oscillating magnetic field around the body, while the charge of the electrons also creates an oscillating electric field along the body of the antenna 175. These time-varying fields radiate away from the antenna 175 into space as a moving transverse RF signal 195 (often an electromagnetic field wave). Conversely, during reception, the oscillating electric and magnetic fields of an incoming RF signal 195 exert force on the electrons in the body of the antenna 175, causing portions of the body of the antenna 175 to move back and forth, creating oscillating currents in the antenna 175.

In certain example embodiments, an antenna 175 can be disposed at, within, or on any portion of the electrical device 102. For example, an antenna 175 can be disposed on the housing 103 of the electrical device 102 and extend away from the electrical device 102. As another example, an antenna 175 can be insert molded into a lens of the electrical device 102. As another example, an antenna 175 can be two-shot injection molded into the housing 103 of the electrical device 102. As yet another example, an antenna 175 can be adhesive mounted onto the housing 103 of the electrical device 102. As still another example, an antenna 175 can be pad printed onto a circuit board within the cavity 101 formed by the housing 103 of the electrical device 102. As yet another example, an antenna 175 can be a chip ceramic antenna that is surface mounted. As still another example, an antenna 175 can be a wire antenna.

An antenna 175 can be electrically coupled to the optional switch 145, which in turn is electrically coupled to the transceiver 124. Without the switch 145, an antenna 175 is directly electrically coupled to the transceiver 124. The optional switch 145 can be a single switch device or a number of switch devices arranged in series and/or in parallel with each other. The switch 145 determines which antenna 175 (in the case of multiple antennae 175) or when the lone antenna 175 is coupled to the transceiver 124 at any particular point in time. A switch 145 can have one or more contacts, where each contact has an open state and a closed state (position). In the open state, a contact of the switch 145 creates an open circuit, which prevents the transceiver 124 from delivering a RF signal 195 to or receiving a RF signal 195 from the antenna 175 electrically coupled to that contact of the switch 145. In the closed state, a contact of the switch 145 creates a closed circuit, which allows the transceiver 124 to deliver a RF signal 195 to or receive a RF signal 195 from the antenna 175 electrically coupled to that contact of the switch 145. In certain example embodiments, the position of each contact of the optional switch 145 is controlled by the control engine 106 of the controller 104.

If the switch 145 is a single device, the switch 145 can have multiple contacts. In any case, only one contact of the switch 145 can be active (closed) at any point in time in certain example embodiments. Consequently, when one contact of the switch 145 is closed, all other contacts of the switch 145 are open in such example embodiments.

Figure 2:
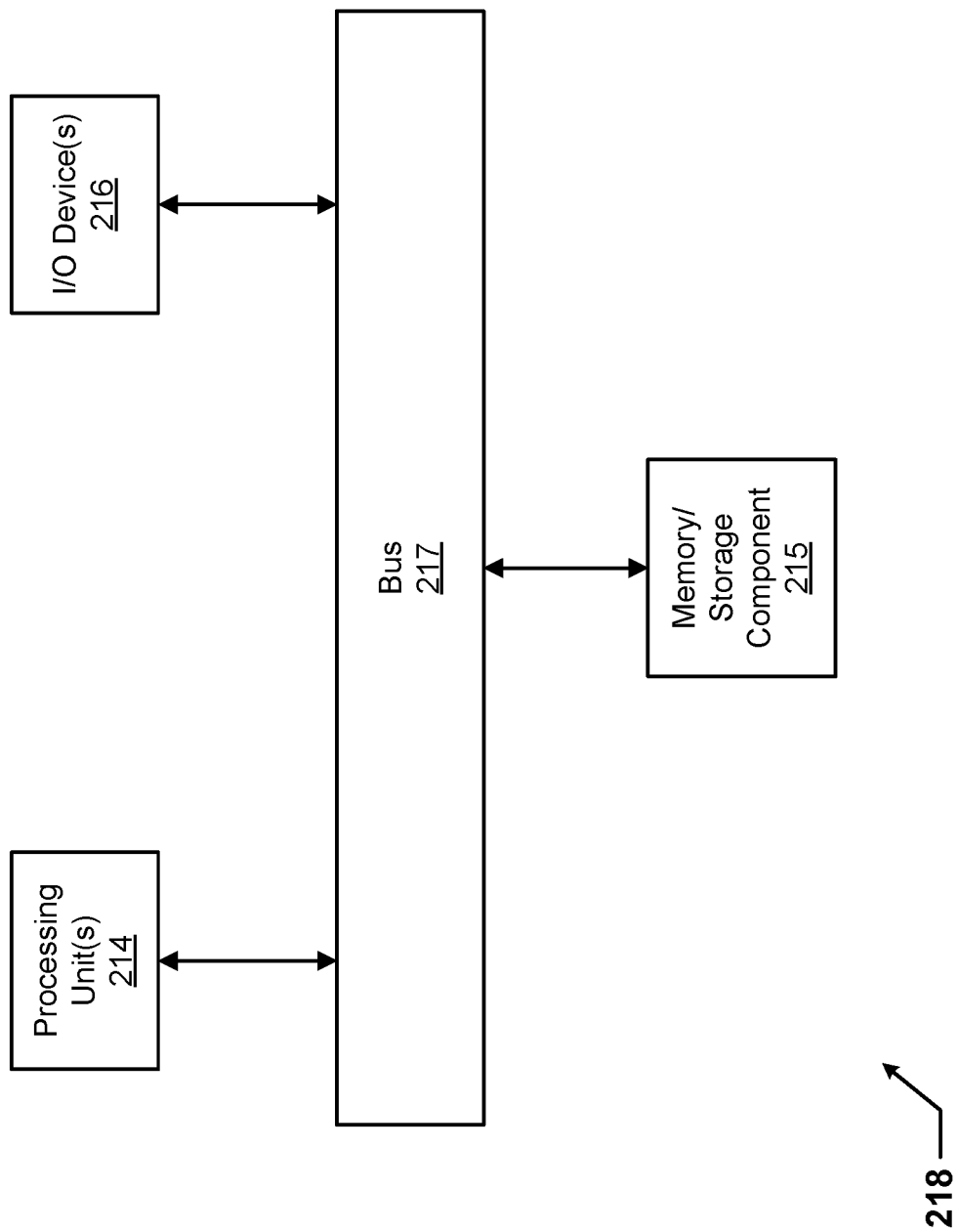
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. For example, the controller 104 of FIG. 1, including its various components (e.g., control engine 106, hardware processor 120, memory 122, storage repository 130) can be considered, in whole or in part, a computing device 218. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
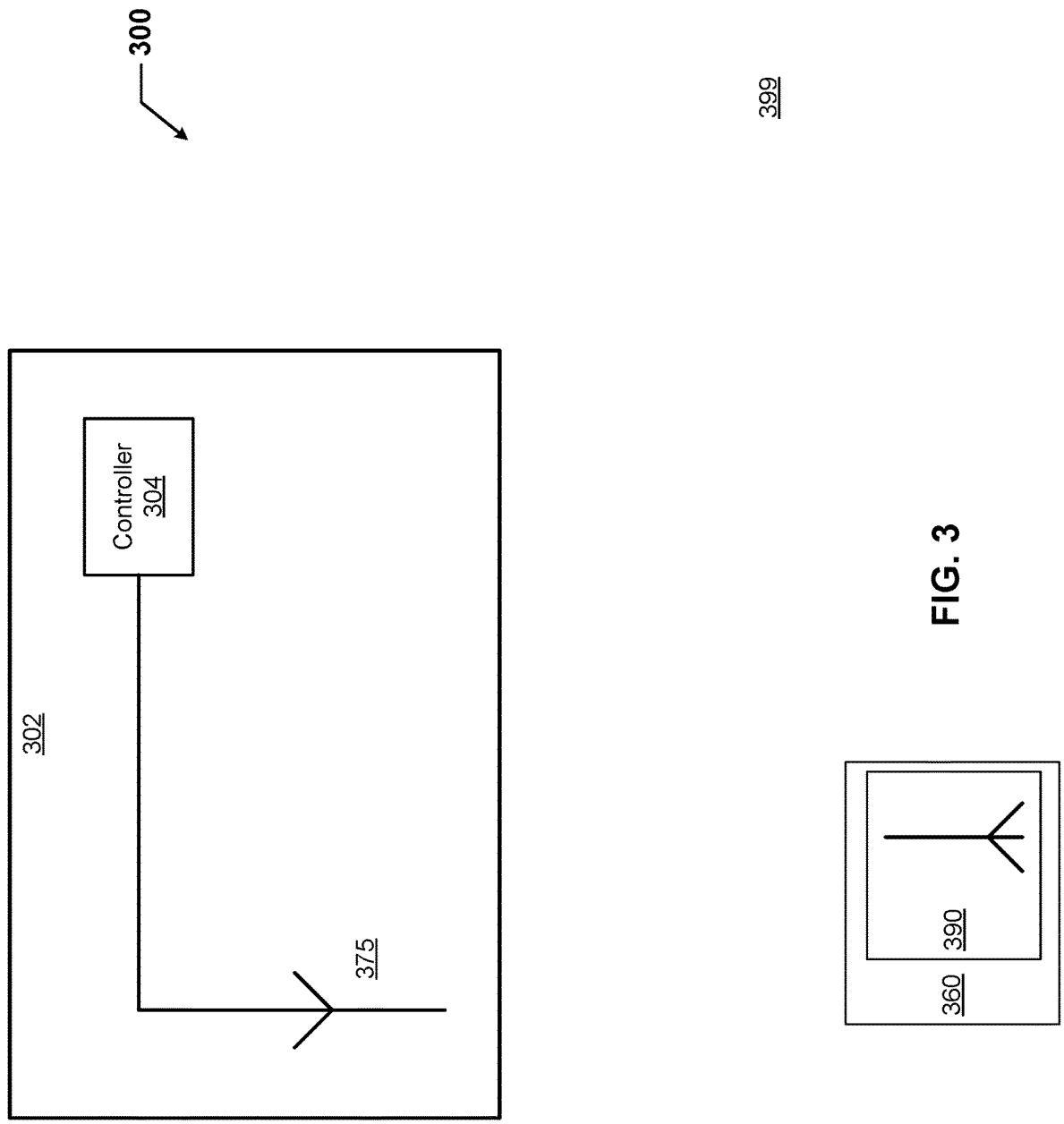
FIG. 3 shows a system in which an object is located in a volume of space in accordance with certain example embodiments.

FIG. 3 shows a system 300 that can use an AoA method to locate an object 360 in a volume of space 399 in accordance with certain example embodiments. Referring to FIGS. 1 through 3, also located in the volume of space 399 of FIG. 3 is a light fixture 302 (or other electrical device) having an antenna 375. As discussed above, the volume of space 399 can be of any size and/or in any location. For example, the volume of space 399 can be a room in an office building.

As shown in FIG. 3, the antenna 375 of the light fixture 302 can be located in the volume of space 399. Alternatively, the antenna 375 can be located on another device (e.g., another light fixture). In any case, it is possible that the antenna 375 can be located outside the volume of space 399, as long as the RF signals (e.g., RF signals 195) sent by the communication device 390 of the object 360 are received by the antenna 375 of the light fixture 302.

The light fixture 302 can also include, as part of the controller 304 of FIG. 3, a control engine (e.g., control engine 106) for automatically operating a transceiver (e.g., transceiver 124) for sending and/or receiving RF signals. Further, the object 360 of FIG. 3 includes a communication device 390, which can be substantially the same as the communication device 190 discussed above with respect to FIG. 1. For example, as shown in FIG. 3, the communication device 390 of FIG. 3 can include an antenna. In some cases, the communication device 390 can also include a controller, which can perform at least some of the capabilities of the controller 104 described above.

Figure 4:
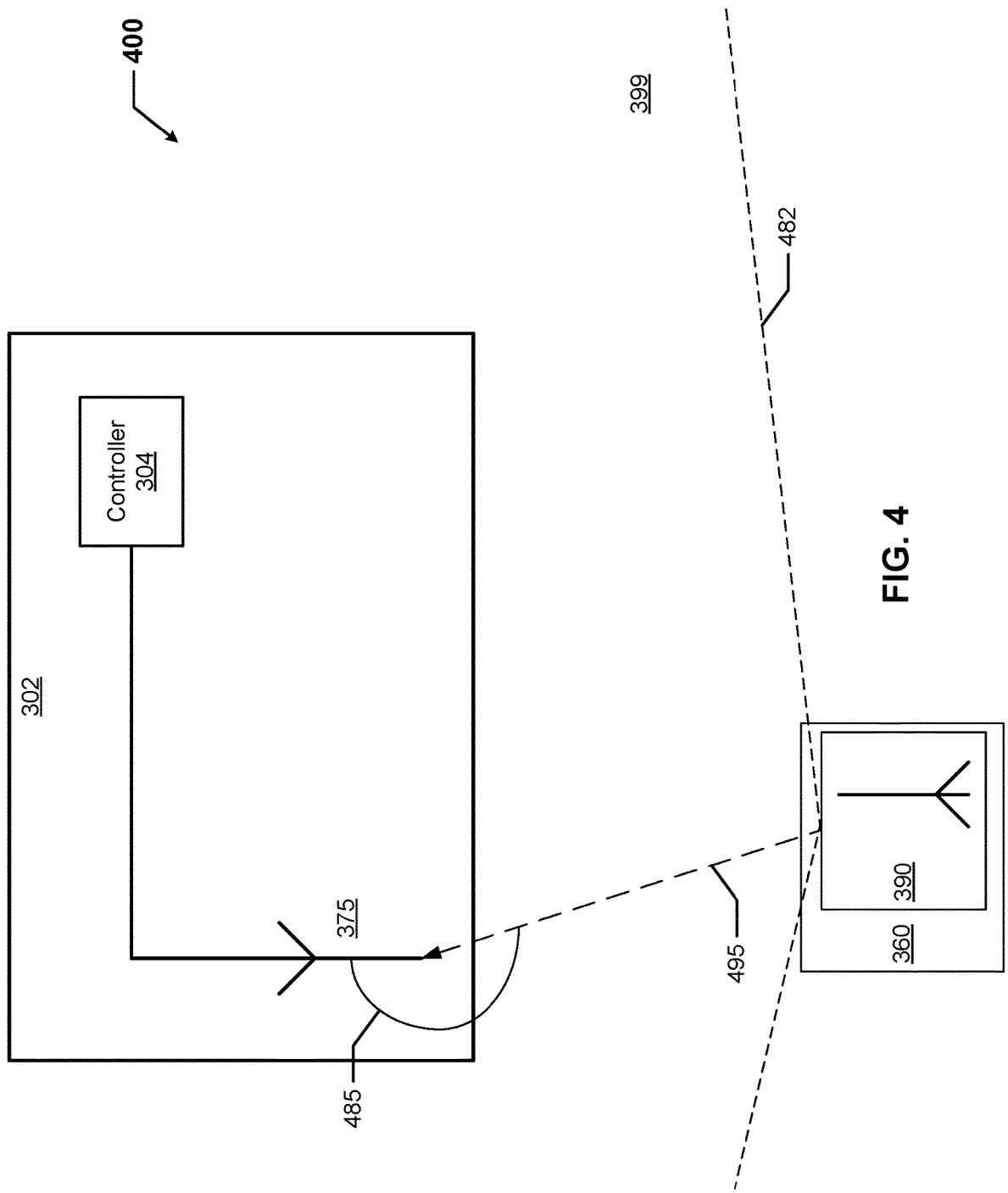
FIGS. 4-6 show the system of FIG. 3 where the object is located in a volume of space using an AoA method in accordance with certain example embodiments.
Figure 5:
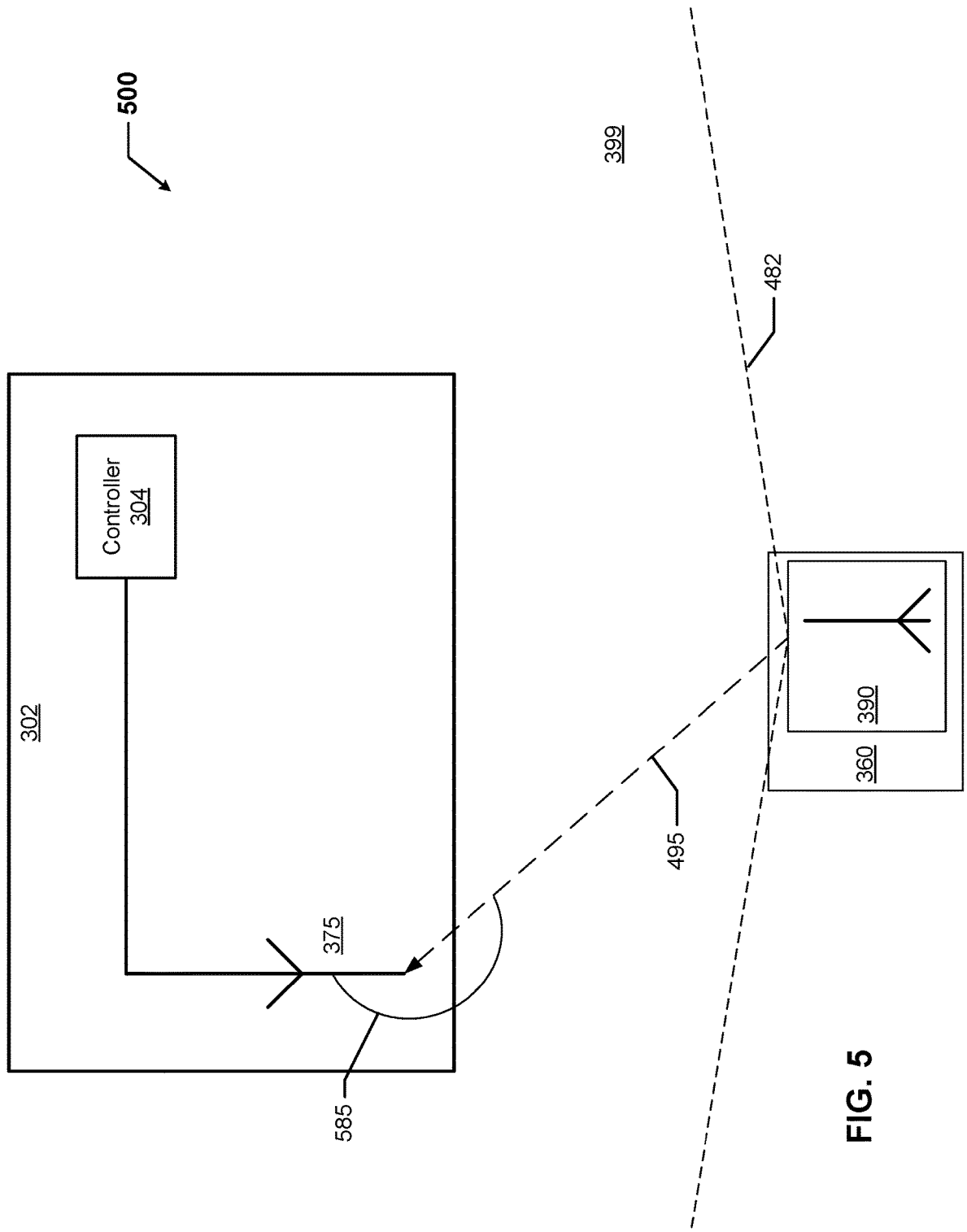
Figure 6:
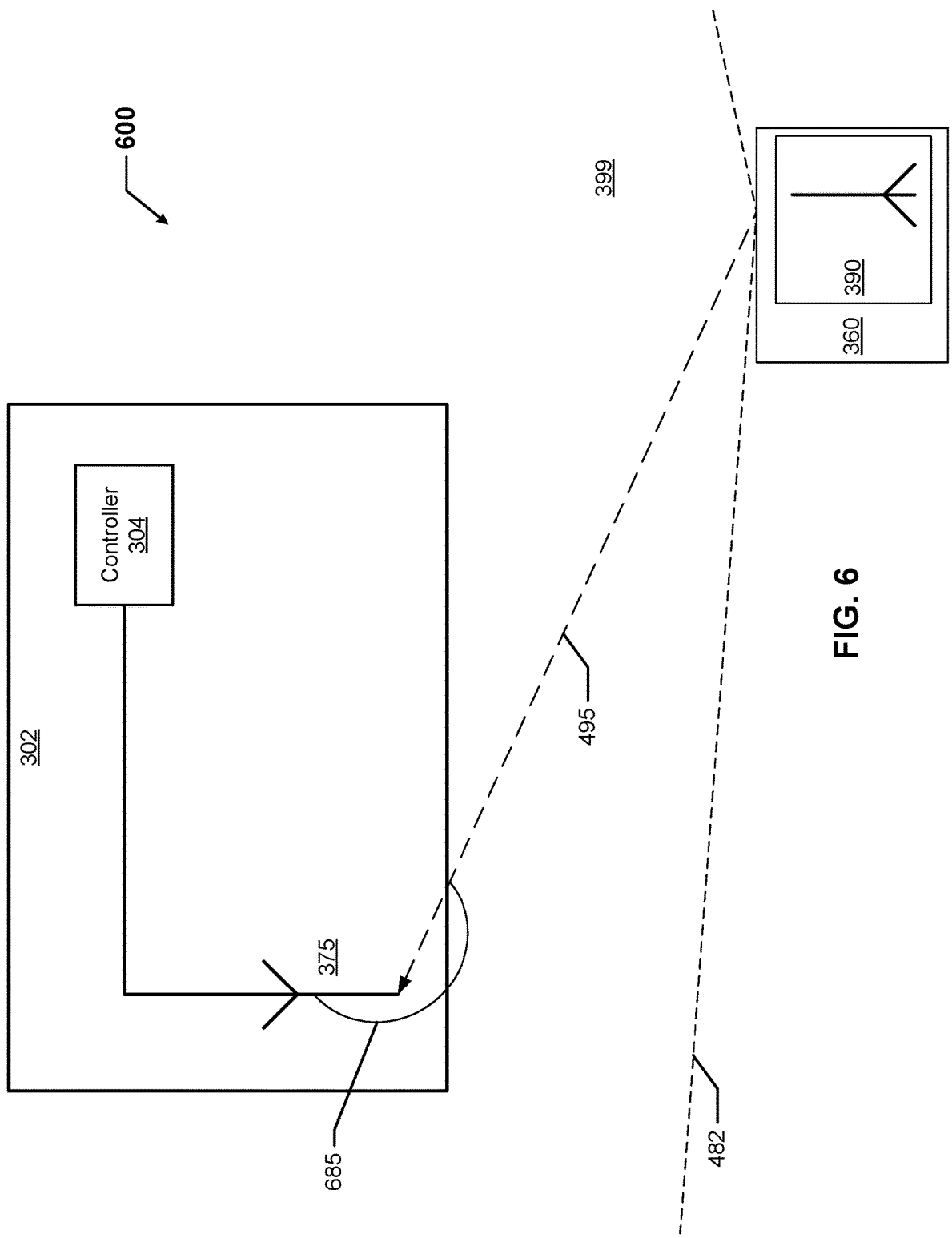

FIGS. 4 through 6 show the system of FIG. 3 when RF signals are sent by the object 360 and the location of the object 360 is determined using an AoA method in accordance with certain example embodiments. FIG. 4 shows the system 400 of FIG. 3 where the communication device 390 of the object 360 begins to broadcast a RF signal 495 in accordance with certain example embodiments. Referring to FIGS. 1-6, antenna 375 of the light fixture 302 receives RF signal 495. The communication device 390 of the object 360 has a default range 482, and the antenna 375 of the light fixture 302 falls within the default range 482.

In FIG. 4, the RF signal 495 is received by the antenna 375 at the point in time captured by FIG. 4 and sent to the controller 304. When the controller 304 receives the RF signal 495 through the antenna 375, the controller 304 can use one or more algorithms 133 and/or protocols 132 to determine the angle 485 at which the RF signal 495 arrives (AoA) at the antenna 375.

At some other subsequent point in time (e.g., 2 ms later, 50 ms later) relative to the time captured in FIG. 4, the controller 304 of the light fixture 302 operates, resulting in the configuration of the system 500 shown in FIG. 5. In FIG. 5, the RF signal 495 is received by the antenna 375 at the point in time captured by FIG. 5 and sent through to the controller 304. When the controller 304 receives the RF signal 495 through the antenna 375, the controller 304 can use one or more algorithms 133 and/or protocols 132 to determine the angle 585 at which the RF signal 495 arrives (AoA) at the antenna 375.

At some other subsequent point in time (e.g., 3 ms later) relative to the time captured in FIG. 5, the controller 304 of the light fixture 302 operates, resulting in the configuration of the system 600 shown in FIG. 6. In FIG. 6, the RF signal 495 is received by the antenna 375 at the point in time captured by FIG. 6 and sent to the controller 304. When the controller 304 receives the RF signal 495 through the antenna 375, the controller 304 can use one or more algorithms 133 and/or protocols 132 to determine the angle 685 at which the RF signal 495 arrives (AoA) at the antenna 375.

An alternative way to interpret FIGS. 4-6 is that the light fixture 302 in FIG. 4 is different from the light fixture 302 in FIG. 5, which is different from the light fixture 302 in FIG. 6, where all 3 light fixtures 302 are part of the same system and are positioned in different locations in the volume of space 399. In such a case, the RF signals 495 shown in FIGS. 4-6 can be broadcast at the same time or at different times. In any event, in the current art, the angles (e.g., angle 585) recorded by each controller 304 are sent to a main controller (e.g., the controller 304 of one of the light fixtures 302, the network manager 180), which uses the angles in one or more algorithms 133 to determine the precise location of the object 360 in the volume of space 399.

Figure 7:
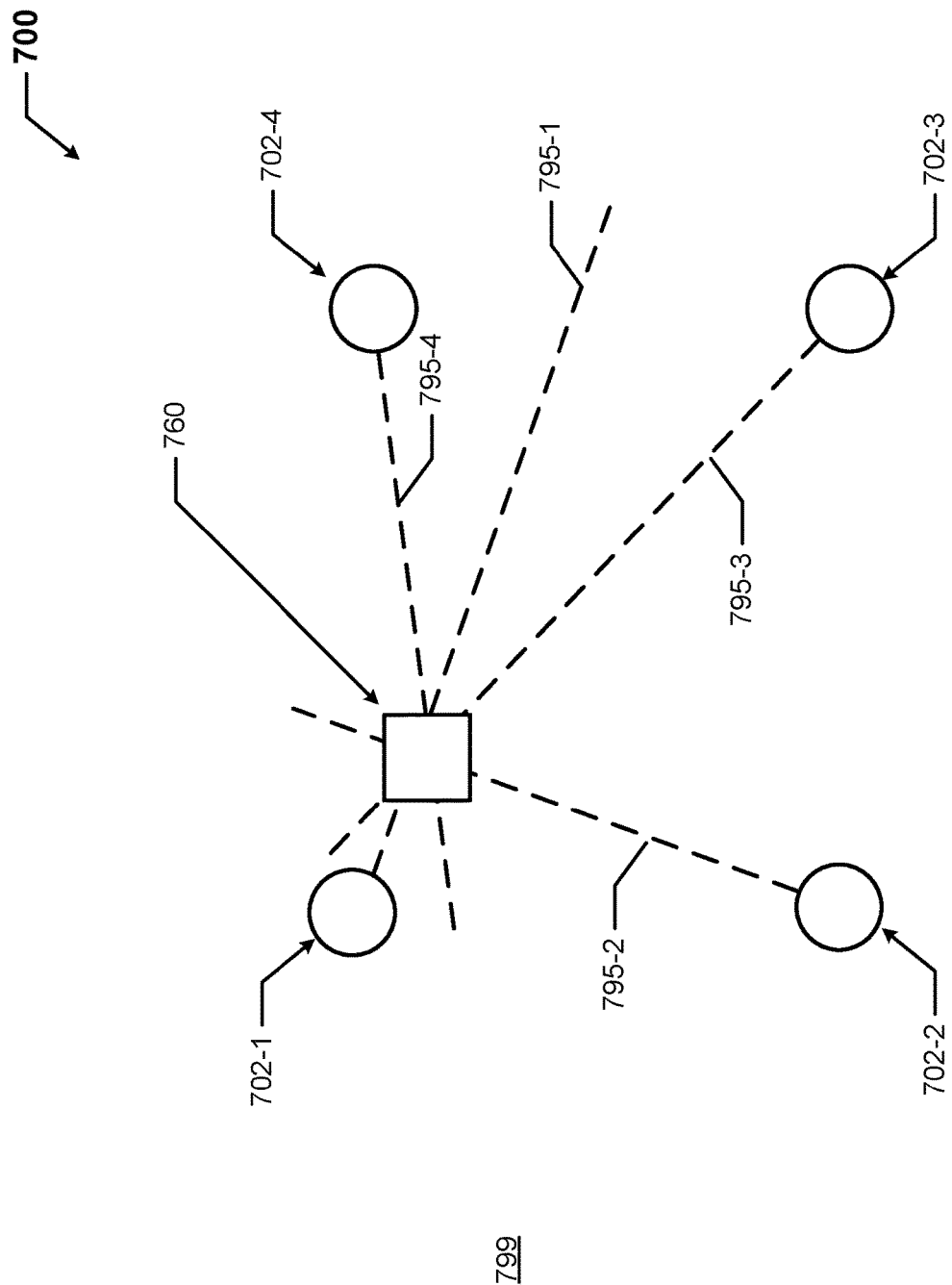
FIG. 7 shows a system of multiple light fixtures used to locate an object in the current art.

FIG. 7 shows a top view of a system 700 of multiple light fixtures 702 (types of electrical devices) used to locate an object in the current art. Referring to FIGS. 1 through 7, the system 700 includes four light fixtures 702 (light fixture 702-1, light fixture 702-2, light fixture 702-3, and light fixture 702-4) and an object 760 located in a volume of space 799. To locate the object 760 in the volume of space 799, each light fixture 702 can transmit one or more RF signals 795. Alternatively, each light fixture 702 acts only as a receiver for RF signals 795 sent by the object 760. In such a case, light fixture 702-1 receives RF signal 795-1 and determines the angle at which the RF signal 795-1 arrives. Light fixture 702-2 receives RF signal 795-2 and determines the angle at which the RF signal 795-2 arrives. Light fixture 702-3 receives RF signal 795-3 and determines the angle at which the RF signal 795-3 arrives. Light fixture 702-4 receives RF signal 795-4 and determines the angle at which the RF signal 795-4 arrives. In addition, all four of the light fixtures 702 have a default range (e.g., broadcast range, receiving range) that overlaps with each other, which is why the RF signal 795 for each light fixture 702 reaches the object 760 in the volume of space.

In order to evaluate the precise location of the object 760 in the volume of space 799, a controller (e.g., controller 104) of one of the light fixtures 702 or some other controller (e.g., network manager 180) in the system 700 collects all of the data from all of the light fixtures 702 and processes the data using one or more algorithms (e.g., algorithms 133) and/or protocols (e.g., protocols 132). This evaluation is often performed on a continuous basis. In any case, the process in the current art to locate the object 760 is very processor and data intensive, which leads to high costs, increased energy consumption, and resource consuming.

Figure 8:
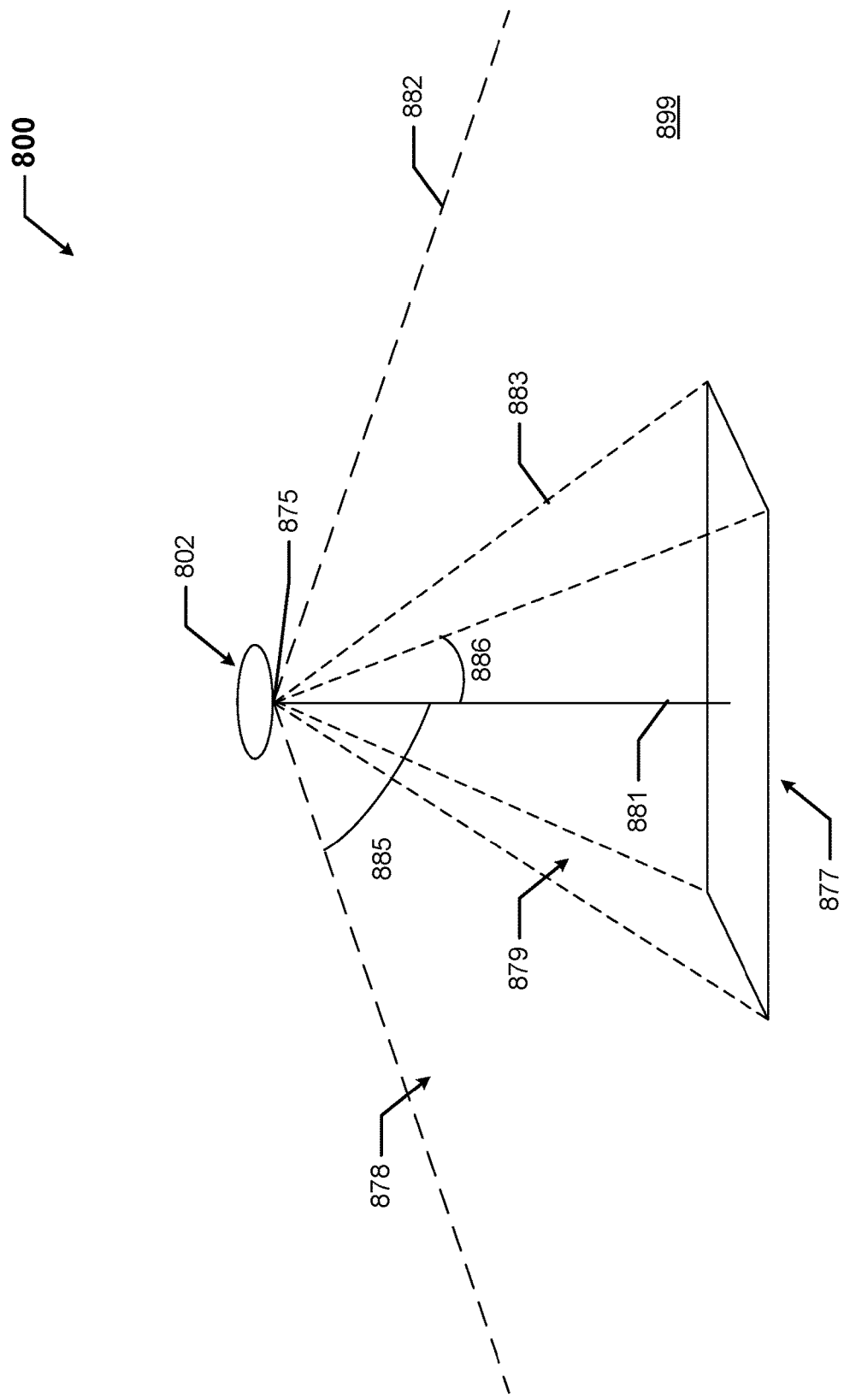
FIG. 8 shows a system for locating an object with a single electrical device in accordance with certain example embodiments.

FIG. 8 shows a perspective view of a system 800 for locating an object 860 with a single electrical device 802 in accordance with certain example embodiments. Referring to FIGS. 1 through 8, the single electrical device 802 of the system 800 is substantially similar to the electrical device 102 of FIG. 1. The electrical device fixture 802 has a default range 878 for receiving RF signals in the volume of space 899. In this case, the default range 878 is a receiving range of RF signals sent by an object and received by the electrical device 802. In addition, or in the alternative, the default range 878 can apply to broadcasting RF signals sent by the electrical device 802. In accordance with certain example embodiments, the controller (e.g., controller 104) of the electrical device 802 has a filter or other capability, as described above, to ignore certain RF signals that fall within the default range 878. In other words, the controller of the electrical device 802 can set an effective range 879 within the default range 878.

For example, for the default range 878 of the electrical device 802, there is a maximum angle 885 at which the RF signals can be received. This maximum angle 885 is measured from a central axis 881 of the antenna 875 of the electrical device 802 to the outer boundary 882 of the default range 878. In this case, the controller of the electrical device 802 creates an effective range 879, which defines an area 877 within the default range 879. The area 877 is coverage of the effective range 879 translated on a surface (e.g., a floor, the ground, a wall) in the volume of space 899. The effective range 879 has an effective maximum angle 886 (measured from the central axis 881 of the antenna 875 of the electrical device 802 to the outer boundary 883 of the effective range 879), which is less than the maximum angle 885. The area 877 in this case is a rectangle, but can be any of a number of other shapes, including but not limited to a circle, an oval, a square, a pentagon, and an octagon. Also, in this case, there is only one area 877, but there can be multiple areas that form one or more effective ranges 879.

When the effective range 879 is in effect, RF signals received by the controller of the electrical device 802 that are within the default range 878 but outside the effective range 879 are ignored. The controller (e.g., controller 104) of the electrical device 802 can make adjustments to the effective range 879. For example, the effective range 879 can be broadened (not to exceed the default range 878) or narrowed. Other examples of an effective range are shown below with respect to FIGS. 10-12.

Figure 9:
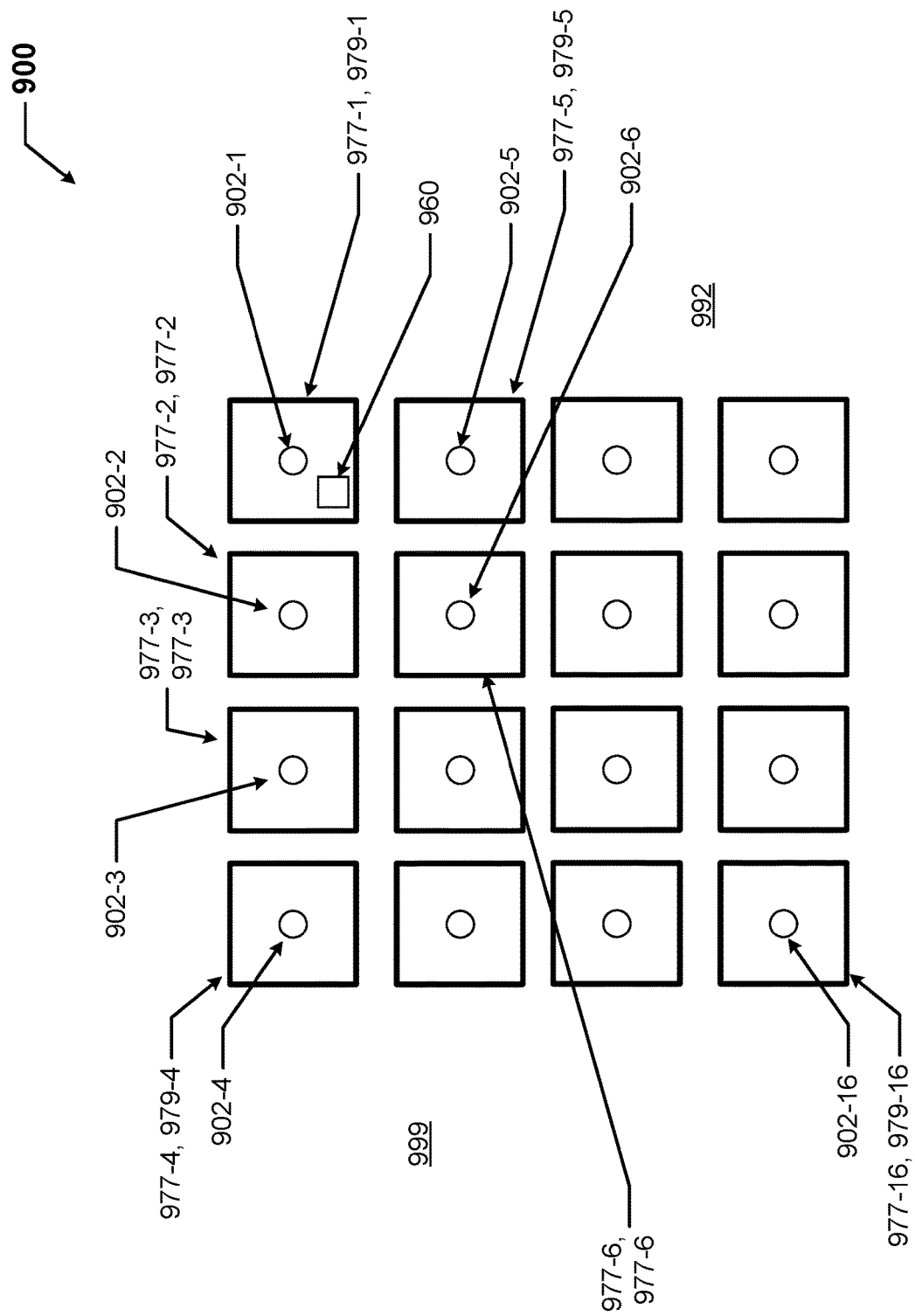
FIG. 9 shows a system of locating an object in accordance with certain example embodiments.

FIG. 9 shows a top view of a system 900 of locating an object in accordance with certain example embodiments. Referring to FIGS. 1 through 9, the system 900 includes 16 light fixtures 902 (types of electrical devices) arranged in a 4-by-4 configuration in the volume of space 999, where a light fixture 902 in each row and column is spaced equidistantly from each adjacent light fixture 902 in the row and/or column. Each light fixture 902 has an effective range 979, as shown by the area 977 translated on a surface 992 (e.g., the ground) for each light fixture 902. By contrast, each light fixture 902 has a default range (e.g., default range 878) that covers the entire volume of space 999 shown in FIG. 9.

In this case, each effective range 979 is created by the controller of each light fixture 902 for receiving RF signals sent by the object 960 and received by that light fixture 902. For example, light fixture 902-1 has effective range 979-1 (as shown by area 977-1 translated on the surface 992), light fixture 902-2 has effective range 979-2 (as shown by area 977-2 translated on the surface 992), light fixture 902-3 has effective range 979-3 (as shown by area 977-3 translated on the surface 992), light fixture 902-4 has effective range 979-4 (as shown by area 977-4 translated on the surface 992), light fixture 902-5 has effective range 979-5 (as shown by area 977-5 translated on the surface 992), light fixture 902-6 has effective range 979-6 (as shown by area 977-6 translated on the surface 992), and so on through light fixture 902-16 having effective range 979-16 (as shown by area 977-16 translated on the surface 992).

The top row of light fixtures 902 is made of light fixture 902-1, light fixture 902-2, light fixture 902-3, and light fixture 902-4. The effective range 979 of each light fixture 902 is substantially the same shape and size as each other, where each area 977 translated on the surface 992 is a square. In this case, there is no overlap between adjacent effective ranges 979. As discussed above, the default ranges (not shown in FIG. 9), without the use of example embodiments and effective ranges, would all overlap each other (or at least have multiple instances of overlap with respect to each other).

An object 960 is located in the volume of space 999. Specifically, the object 960 is located within the effective range 979-1 of light fixture 902-1. In addition, since there is no overlap of the effective ranges 979, the object 960 is not within any of the other effective ranges 979, including adjacent effective range 979-2, adjacent effective range 979-5, and adjacent effective range 979-6. In this way, since the object 960 is only detected within a single effective range 979-1, the precise location of the object 960 is not determined using methods (e.g., triangulation) currently used in the art that require high levels of processing, power, bandwidth, and other resources. Rather, example embodiments focus on the mere identification and approximate location of the object 960 while using a minimal amount of processing, power, bandwidth, and related resources.

In this way, example embodiments bring the location engine of an object 960 to the light fixture level rather than a system level (as used in the current art). In this example, the controller of light fixture 902-1 is the only controller in the system 900 that identifies the object 960, and the light fixture 902-1 communicates the identification of the object 960 within the effective range 979-1. None of the other light fixtures 902 in the system 900 communicate the identification of the object 960, even if the object 960 is within the default range of the light fixture 902, because the controller is each light fixture ignores a RF signal that is not within the corresponding effective range 979 (as opposed to the default range) of that light fixture 902.

While the system 900 of FIG. 9 shows no overlap of effective ranges 979, in some cases, one effective range 979 can overlap with one or more adjacent effective ranges 979. In such a case, if the local controller of multiple light fixtures 902 detect the object 960, no complicated algorithms (e.g., triangulation) are performed to find the precise location of the object 960 in the volume of space 999. Rather, the controllers of the multiple light fixtures 902 independently report detection of the object 960 within their respective effective ranges 979.

FIGS. 10 through 12 shows various configurations of an effective range in accordance with certain example embodiments. Referring to FIGS. 1 through 12, an effective range does not need to be symmetrical and/or continuous. For example, FIG. 10 shows a top view of a system 1000 with a single light fixture 1002 (or other electrical device) having an effective range 1079 (in this case, for receiving RF signals from an object) in the form of two concentric circles. Specifically, effective range 1079-1 forms a circle (as shown by the area 1077-1 translated on the surface 1092) having a center that coincides with the vertical position of the light fixture 1002, and effective range 1079-2 forms a circular ring (as shown by the area 1077-2 translated on the surface 1092) having the same center. The radius of the inner perimeter of the effective range 1079-2 (and so also the corresponding area 1077-2) is larger than the radius of the outer perimeter of the effective range 1079-1 (and so also the corresponding area 1077-2), leaving a gap 1064 between effective range 1079-1 and effective range 1079-2 at the surface 1092. The effective range 1079-1 and the effective range 1079-2 are conically shaped when viewed in three dimensions.

As another example, FIG. 11 shows a top view of a system 1100 with a single light fixture 1102 (or other electrical device) having an effective range 1179 (in this case, for receiving RF signals from an object) in the form of a square, as shown by the area 1177 translated on the surface 1192. In this case, the light fixture 1102 is vertically centered over a corner of the effective range 1179 (and so also the area 1177). Specifically, the effective range 1179 (and so also the area 1177) is positioned in the upper right quadrant relative to the position of the light fixture 1102 according to the perspective offered in FIG. 11.

As yet another example, FIG. 12 shows a top view of a system 1200 with a single light fixture 1202 (or other electrical device) having four effective ranges 1279 (in this case, for receiving RF signals from an object), each in the form of a triangle, as shown by the areas 1277 translated on the surface 1292. The triangle shape of the four effective ranges 1279 (and so also the corresponding areas 1277) are substantially the same size as each other. Specifically, effective range 1279-1 (and so also corresponding area 1277-1) is located above and to the left (in the upper left quadrant) of the light fixture 1202. Effective range 1279-2 (and so also corresponding area 1277-2) is located above and to the right (in the upper right quadrant) of the light fixture 1202. Effective range 1279-3 (and so also corresponding area 1277-3) is located below and to the left (in the lower left quadrant) of the light fixture 1202. Effective range 1279-4 (and so also corresponding area 1277-4) is located below and to the right (in the lower right quadrant) of the light fixture 1202.

In certain example embodiments, the multiple effective ranges 1279 of FIG. 12 can also be viewed as a single effective range with multiple zones (in this case, zones 1-4). Also, when there are multiple effective ranges 1279 (or multiple zones of a single effective range 1279), the shape and/or size of one of those effective ranges 1279 (or zones) can be the same as, or different than, the shape and/or size of any or all of the other effective ranges 1279 (or zones).

While the light fixture 1202 is located in the approximate center relative to the four effective ranges 1277, one effective range 1279 is not oriented symmetrically around the light fixture 1202 relative to the other 3 effective ranges 1279 from all perspectives. Specifically, effective range 1279-1 (and so also corresponding area 1277-1) and effective range 1279-2 (and so also corresponding area 1277-2) are symmetrically oriented along a horizontal axis through the light fixture 1202 relative to effective range 1279-3 (and so also corresponding area 1277-3) and effective range 1279-4 (and so also corresponding area 1277-4). Also, effective range 1279-1 (and so also corresponding area 1277-1) and effective range 1279-3 (and so also corresponding area 1277-3) are symmetrically oriented along a vertical axis through the light fixture 1202 relative to effective range 1279-2 (and so also corresponding area 1277-2) and effective range 1279-4 (and so corresponding area 1277-4).

However, for a diagonal axis that runs through the light fixture 1202, the opposite effective ranges 1279 (and so also the corresponding areas 1277) are not symmetrical with respect to each other. Specifically, for a diagonal axis running from the lower left to the upper right through the light fixture 1202, effective range 1279-1 (and so also corresponding area 1277-1) is not symmetrical with respect to effective range 1279-4 (and so also corresponding area 1277-4). Similarly, for a diagonal axis running from the upper left to the lower right through the light fixture 1202, effective range 1279-2 (and so also corresponding area 1277-2) is not symmetrical with respect to effective range 1279-3 (and so also corresponding area 1277-3). .

The light fixture 1202 of FIG. 12 can have four antennae (e.g., antennae 175), where each antenna is focused on each of the four quadrants (from the perspective given in FIG. 12), and the controller (e.g., controller 104) of the light fixture 1202 establishes the four effective ranges 1279 based on the four default ranges. Alternatively, the light fixture 1202 can have a single antenna having a default range that encompasses all four quadrants, and the controller of the light fixture 1202 can generate the four effective ranges 1279 from the single default range. As yet another alternative, the light fixture 1202 can have any other number (e.g., two, three) of antennae, and the controller of the light fixture 1202 can generate the four effective ranges 1279 based on the default ranges of those antennae.

The shape and/or size of an effective range for a light fixture can be the same as, or different than, the shape and/or size of an effective range for at least one other light fixture in a system. The shape and/or size of an effective range for a light fixture can vary based on one or more of a number of factors, including but not limited to the location of the light fixtures in the system relative to each other, the default range of each light fixture in the system, the size of the object, In one or more example embodiments, multiple electrical devices (e.g., light fixtures) use transceivers (rather than merely transmitters) to send out RF signals, the response to which from the object is used to determine the multi-dimensional location of the object in a volume of space. In some cases, only a receiver can be used for the electrical devices for signals that originate from an object. When multiple electrical devices are used, the default range of each is reduced (creating an effective range for each electrical device) so that signals received outside the effective range are ignored. In this way, example embodiments are concerned merely with the identification and approximate location of an object in a volume of space, as opposed to a precise location of the object. As a result of example embodiments, the electrical devices use fewer resources (e.g., processing requirements, bandwidth, power) to locate one or more objects. Example embodiments can provide real-time location of an object in a volume of space. Using example embodiments described herein can improve communication, safety, maintenance, costs, and operating efficiency. Example embodiments can be used with any type of location method, including but not limited to AoA and AoD.

Accordingly, many modifications and other embodiments set forth herein will come to mind to one skilled in the art to which example embodiments pertain having the benefit of the teachings presented in the foregoing descriptions and the associated drawings. Therefore, it is to be understood that example embodiments are not to be limited to the specific embodiments disclosed and that modifications and other embodiments are intended to be included within the scope of this application. Although specific terms are employed herein, they are used in a generic and descriptive sense only and not for purposes of limitation.

What is claimed is:

1. A system for locating an object in a volume of space, comprising:
a first electrical device disposed in the volume of space and comprising a first antenna and a first controller, wherein the first controller reduces a first default range of angles at which signals can be received by the first antenna to a first effective range;
an object disposed within the first effective range of angles, wherein the first controller determines a first angle of arrival corresponding to a first signal transmitted by the object and received by the first electrical device, and wherein the first controller recognizes the first signal, using the first antenna, that identifies the object in the first effective range of angles based on the first angle of arrival;
a second electrical device disposed in the volume of space and comprising a second antenna and a second controller, wherein the second controller reduces a second default range of angles of the second antenna to a second effective range of angles,
wherein the object is located within the second default range of angles and outside the second effective range of angles, and
wherein the second controller ignores a second signal, using the second antenna, that identifies the object in the second default range of angles and outside the second effective range of angles.

2. The system of claim 1, wherein the first effective range of angles and the second effective range of angles fail to overlap, and wherein the first effective range of angles and the second default range of angles overlap.

3. The system of claim 1, wherein the object subsequently moves out of the first effective range of angles and within the second effective range of angles, at which time the second controller recognizes a third signal, using the second antenna, that identifies the object in the second effective range of angles, and wherein the first controller ignores a fourth signal, using the first antenna, that identifies the object in the first default range and outside the first effective range of angles.

4. The system of claim 1, wherein the object initiates the first signal.

5. The system of claim 1, wherein the first signal comprises a radio frequency signal transmitted using Bluetooth low energy.

6. The system of claim 1, wherein the first signal comprises an identification of the object.

7. The system of claim 1, wherein the electrical device comprises a light fixture.

8. The system of claim 1, wherein the first controller ignores the first signal that identifies the object outside the first effective range of angles and within the first default range of angles.

9. An electrical device used to locate an object in a volume of space, the electrical device comprising:
a first antenna having a first default range of angles at which signals can be received by the first antenna; and
a controller coupled to the first antenna, wherein the controller reduces the first default range of angles to a first effective range of angles,
wherein the controller determines a first angle of arrival corresponding to a first radio frequency (RF) signal transmitted by the object and received by the first electrical device,
wherein the controller ignores the first RF signal associated with the object that is received from within the first default range of angles but outside the first effective range of angles based on the first angle of arrival,
wherein the controller determines a second angle of arrival corresponding to a second RF signal transmitted by the object and received by the electrical device, and
wherein the controller recognizes the second RF signal associated with the object that is received from within the first effective range of angles based on the first angle of arrival.

10. The electrical device of claim 9, wherein the controller sends a communication, wherein the communication comprises an identification of the object contained in the second RF signal.

11. The electrical device of claim 9, further comprising:
a second antenna coupled to the controller and having a second default range of angles, wherein the controller reduces the second default range of angles to a second effective range of angles, wherein the controller ignores the first RF signal associated with the object that is received from within the second default range of angles but outside the second effective range of angles, and wherein the controller recognizes the second RF signal associated with the object that is received from within the second effective range of angles, and wherein the controller sends a communication that includes an identification of the object contained in the second RF signal.

12. The electrical device of claim 11, wherein the first effective range of angles has a first shape and a first size, and wherein the second effective range of angles has a second shape and a second size.

13. The electrical device of claim 9, further comprising:
a second antenna coupled to the controller and having a second default range of angles, wherein the controller reduces the second default range of angles to a second effective range of angles, wherein the controller ignores the first RF signal and the second RF signal associated with the object that are received from within the second default range of angles but outside the second effective range of angles, wherein the controller fails to send a communication that includes an identification of the object contained in the second RF signal because the second RF signal falls outside the second effective range of angles of the second antenna.

14. The electrical device of claim 9, wherein the first effective range of angles is continuous.

15. The electrical device of claim 9, wherein the first effective range of angles comprises multiple zones.

16. The electrical device of claim 9, wherein the first effective range of angles is based on an angle at which the first RF signal and the second RF signal are received by the first antenna.

17. The electrical device of claim 9, wherein the first effective range of angles is adjustable by the controller or by a user.

18. The system of claim 1, wherein the first effective range of angles and the second effective range of angles are arranged concentrically about the first electrical device, and wherein the first effective range of angles and the second effective range of angles are discontinuous.

19. The electrical device of claim 11, wherein the first effective range of angles and the second effective range of angles are arranged concentrically about the first electrical device, and wherein the first effective range of angles and the second effective range of angles are discontinuous.

* * * * *